July 1, 1952  H. LOWENTHAL  2,601,805
HIGHLY CORRECTED FOUR COMPONENT PHOTOGRAPHIC OBJECTIVE
Filed Jan. 29, 1951
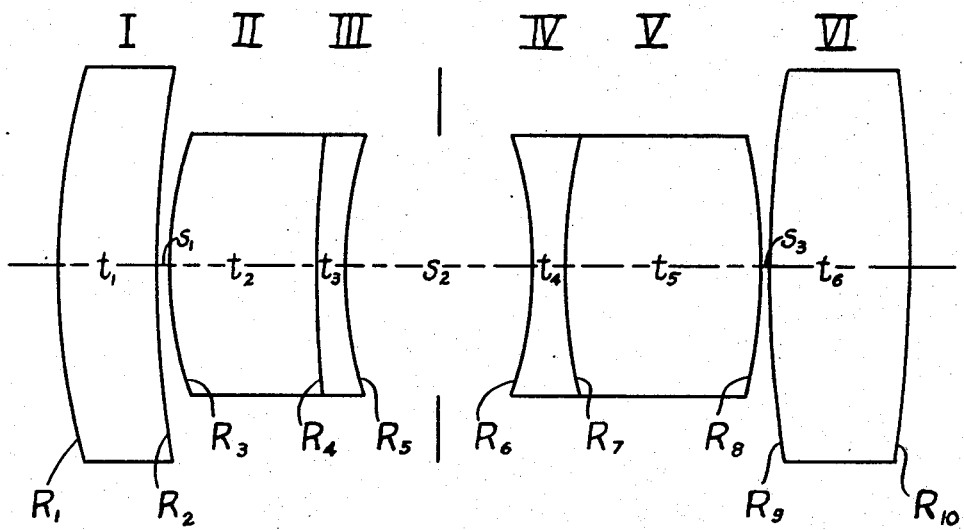
Herman Lowenthal
INVENTOR.
BY Zabel and Gritzbaugh
Attorneys Patented July 1, 1952

2,601,805

UNITED STATES PATENT OFFICE 2,601,805

HIGHLY CORRECTED FOUR COMPONENT PHOTOGRAPHIC OBJECTIVE

Herman Lowenthal, Chicago, Ill., assignor to General Scientific Corporation, Chicago, Ill., a corporation of Illinois Application January 29, 1951, Serial No. 208,359

3 Claims. (Cl. 88—57)

My invention relates to a photographic objective, and particularly to an objective having a high degree of correction and capable of operation at a large aperture with substantial covering power.

The invention provides an objective having six lenses, and it is capable of being used at an aperture of F:1.4. A photographic objective operating with such a large aperture must have a high degree of correction if it is to be satisfactory for photographic work. This is particularly true in an objective having as many as six lenses. As is well known, each lens introduces its own optical problems into the system even though it attempts to correct some of the difficulties and problems present in the system as a whole.

In order for a photographic objective to have suitable quality, it must be corrected for spherical aberration, sine condition, coma, field curvature, astigmatism, rim ray agreement, lateral color aberration, ghost images and aberrations with respect to the Petzval condition. In particular, a photographic objective also requires good correction to overcome distortion.

The lens system forming the subject matter of this invention resembles prior art lens systems in the provision of a space for a diaphragm between two groups of lens components. In the following discussion of the lenses or components forming my lens system, the usual conventions with regard to positive and negative lens curvature are observed. Thus the components are numbered with Roman numerals progressively from the first or outer lens at the left of the system. Where the center of curvature of a lens falls to the right of the surface being considered, the surface is regarded as positive with the actual radius being measured along the axis of the lens system. Where the center of curvature falls to the left of the surface being considered, then the surface is considered as negative.

With regard to the characteristics of the glass, terms customarily used in the art are used. Thus, for example, $N_D$ is the index of refraction for the D lines of the spectrum (these lines customarily being present in a sodium flame) and V is the dispersion number. The spacings $s$ and thicknesses $t$ are considered along the axis of the lens system.

The lens system embodying my invention has single lenses as the outer components thereof. The remaining lenses are arranged as cemented compound doublets to form two additional components. The outer components of the system are positive, and the inner components are highly concave toward a central region where a diaphragm may be located.

A particularly important feature characterizing the system embodying the present invention is the construction of the outer components of glass having a high index of refraction and a rather low dispersion number. Additionally, the next to the last lens element is also constructed of glass having a very high index of refraction and a low dispersion number. Thus, the first, fifth and sixth lenses may conveniently be made of the same glass. The remaining lenses are formed of glass having moderately high indices of refraction. The second lens has a very high dispersion number, and the third and fourth lenses have low dispersion numbers.

A lens system embodying the present invention provides as much correction as is ordinarily present in well-designed prior art objectives having seven and eight elements. By the elimination of one or two lens elements, such difficulties as the grinding of additional lenses as well as the cementing of such additional lenses is eliminated.

I have found that by constructing the first lens element of a high index glass there is provided a high degree of correction to spherical aberration. I have also reduced distortion to a low value by constructing the fifth and sixth lens elements of high index glass. In particular, I have found out that the higher the index of refraction the glass has for the sixth element, the greater can be the radius of curvature of the second-from-last surface (the forward lens surface of the sixth lens). It is thus possible to have the forward surface of the last lens almost aplanatic. Such a surface is advantageous since the effects on spherical aberration and coma are reduced to a negligible value. At the same time, such an arrangement provides a minimum amount of distortion to the lens system as a whole.

An example of a lens system embodying my invention will be given. This lens system, as mentioned, is intended for use at a maximum aperture of F:1.4, and it has a focal length of 100.

With such a large aperture, the zonal spherical aberration for the D lines of the spectrum amounts to about .08 per cent of the focal length of the system. Oblique aberrations are corrected to a very high degree. At a total field angle of 29 degrees, the curvatures of field are respectively .55 and .20 per cent of the focal length of the lens system. At this same field angle of 29 degrees, the distortion is .97 per cent. The Petzval sum up to third order terms is numerically so low that the amount of astigmatism introduced by virtue of having a flat field is negligible.

The objective of my invention is illustrated diagrammatically in the single figure of the accompanying drawing. The several lenses are designated by Roman numerals counting from the front or left of the system. The radii of curvature are marked $R_1$, $R_2$, etc. The lens thicknesses and lens spacings along the axis are respectively marked $t_1$, $t_2$, etc., and $s_1$, $s_2$ etc.

The following example is representative of my invention:

Focal length ---------------------------- = 100
Back focal length ---------------------- = 54.71
Aperture -------------------------------- = F:1.4

| Lens | $N_D$ | V | Radii | Axial Distances |
|---|---|---|---|---|
| I | 1.7456 | 44.6 | $R_1 = +85.50$ | |
| | | | $R_2 = +408.30$ | $t_1 = 11.60$ |
| | | | | $s_1 = 1.50$ |
| II | 1.620 | 60.0 | $R_3 = +40.35$ | |
| | | | | $t_2 = 17.00$ |
| | | | $R_4 = +156.05$ | $t_3 = 3.50$ |
| III | 1.621 | 36.2 | | |
| | | | $R_5 = +25.05$ | |
| | | | | $s_2 = 22.0$ |
| IV | 1.689 | 30.9 | $R_6 = -36.80$ | |
| | | | | $t_4 = 3.50$ |
| | | | $R_7 = +55.00$ | |
| V | 1.7456 | 44.6 | | $t_5 = 23.00$ |
| | | | $R_8 = -51.50$ | |
| | | | | $s_3 = 1.00$ |
| VI | 1.7456 | 44.6 | $R_9 = +123.50$ | |
| | | | | $t_6 = 17.00$ |
| | | | $R_{10} = -204.95$ | |

In the above example, it is possible to use a glass for the first, fifth and sixth lenses whose index of refraction varies between about 1.7 and about 1.8. The dispersion preferably should be between about 42 and 48. It will be noted that the glass for the fourth lens has a value of $N_D$ somewhat smaller than the first lens and larger than the second and third lenses. The glass for the fourth lens, in general, may have a refraction index whose value is about half-way between the extreme values for the first lens and the second lens.

Some variation in the radius of curvature is also possible. Thus it will be noted that $R_2$ is a bit greater than four times the focal length of the objective. $R_{10}$ is negative and is substantially one-half the absolute value of $R_2$. $R_3$ is a bit larger than one-fourth of the value of $R_4$, and $R_4$ is substantially one and one-half times the focal length of the objective. $R_5$ and $R_6$ are respectively positive and negative and are small compared to the focal length of the objective $R_7$ and $R_8$ are also respectively positive and negative and are both a bit larger than one-half the focal length of the objective. $R_9$ is somewhat greater than the focal length of the objective and becomes larger with increase in the index of refraction of the glass used for this lens.

It will be noted that the axial distance or separation between each outer component and the adjacent compound doublet is of the order of about one per cent of the focal length of the objective. The distance between the doublets is quite substantial, to accommodate a diaphragm, and is of the order of about one-fourth of the focal length of the objective.

From the above description it is thought that the construction and advantages of my invention will be readily apparent to those skilled in the art. Various minor changes in design may be made without departing from the spirit or losing the advantages of the invention.

Having thus described my invention, what I claim as new and desire to secure by Letters Patent is:

1. A photographic objective of the type having six lenses divided into four components with air separation between adjacent components, said objective having the two outer components as single lenses and the two inner components formed as compound doublets, said two inner components having a space therebetween to accommodate a diaphragm, the first, fifth and sixth lenses being formed of glass having a high index of refraction of between 1.7 and 1.8 with a low dispersion number of the order of about 45, the remaining three lenses being formed of glass having an index of refraction of between 1.6 and 1.7, the second lens having a dispersion number of about 60 and the remaining two lenses having dispersion numbers of between 30 and 40, the radii, axial thickness of a lens and separation being substantially as follows:

$R_1 = +85.50$; $R_2 = +408.30$; $R_3 = +40.35$;
$R_4 = +156.05$; $R_5 = +25.05$; $R_6 = -36.80$;
$R_7 = +55.00$; $R_8 = -51.50$; $R_9 = +123.50$;
$R_{10} = -204.95$; $t_1 = 11.60$; $s_1 = 1.50$;
$t_2 = 17.00$; $t_3 = 3.50$; $s_2 = 22.00$;
$t_4 = 3.50$; $t_5 = 23.00$; $s_3 = 1.00$;
$t_6 = 17.00$ where R, t and s are respectively radius, thickness and separation beginning from the front of the system and where the focal length of the system is 100.

2. A photographic objective consisting of six lenses formed into four components with the outer components being single lenses and the two inner components being compound doublets, said two outer components being positive and the two inner components having comparatively short radii and being concave toward a diaphragm location between said two inner components, said first, fifth and sixth lenses being formed of glass having an index of refraction of 1.7456 and a dispersion number of 44.6, said second lens being formed of glass having an index of refraction of 1.62 and a dispersion number of 60, the third lens being formed of glass having an index of refraction of about 1.62 and a dispersion number of about 36, the fourth lens being formed of glass having an index of refraction of about 1.69 and a dispersion number of about 31, the radii, axial thickness of a lens and separation being substantially as follows:

$R_1 = +85.50$; $R_2 = +408.30$; $R_3 = +40.35$;
$R_4 = +156.05$; $R_5 = +25.05$; $R_6 = -36.80$;
$R_7 = +55.00$; $R_8 = -51.50$; $R_9 = +123.50$;
$R_{10} = -204.95$; $t_1 = 11.60$; $s_1 = 1.50$;
$t_2 = 17.00$; $t_3 = 3.50$; $s_2 = 22.00$;
$t_4 = 3.50$; $t_5 = 23.00$; $s_3 = 1.00$;
$t_6 = 17.00$ where R, t and s are respectively radius, thickness and separation beginning from the front of the system and where the focal length of the system is 100.

3. A high aperture highly corrected photographic objective of 100 units focal length and six lens elements having substantially the following details:

| Lens | $N_D$ | V | Radii | Axial Distances |
|---|---|---|---|---|
| I | 1.7456 | 44.6 | $R_1= +85.50$ | |
| | | | $R_2=+408.30$ | $t_1=11.60$ |
| | | | | $s_1= 1.50$ |
| II | 1.620 | 60.0 | $R_3= +40.35$ | |
| | | | $R_4=+156.05$ | $t_2=17.00$ |
| III | 1.621 | 36.2 | $R_5= +25.05$ | $t_3= 3.50$ |
| | | | | $s_2=22.0$ |
| IV | 1.689 | 30.9 | $R_6= -36.80$ | |
| | | | $R_7= +55.00$ | $t_4= 3.50$ |
| V | 1.7456 | 44.6 | | $t_5=23.00$ |
| | | | $R_8= -51.50$ | $s_3= 1.00$ |
| VI | 1.7456 | 44.6 | $R_9=+123.50$ | $t_6=17.00$ |
| | | | $R_{10}=-204.95$ | | said first column specifying the lens elements from front to rear progressively, where $N_D$ is the index of refraction, V is the dispersion, R is the radius of the glass surfaces, $t$ is the axial thickness of the glass lenses and $s$ is the axial distance in air between adjacent lens surfaces and where the plus and minus signs indicate respectively that the axial radius extends toward the rear or toward the front of the objective, said objective being adapted to operate with an aperture of F:1.4.

HERMAN LOWENTHAL.

REFERENCES CITED

The following references are of record in the file of this patent:

UNITED STATES PATENTS

| Number | Name | Date |
|---|---|---|
| 1,955,591 | Lee | Apr. 17, 1934 |
| 2,117,252 | Lee | May 10, 1938 |
| 2,194,413 | Warmisham | Mar. 19, 1940 |
| 2,250,337 | Warmisham | July 22, 1941 |
| 2,475,938 | Altman | July 12, 1949 |
| 2,532,752 | Baker | Dec. 5, 1950 |

FOREIGN PATENTS

| Number | Country | Date |
|---|---|---|
| 420,223 | Germany | Oct. 19, 1925 |